(12) United States Patent
Ende, Van Den

(10) Patent No.: US 11,310,972 B2
(45) Date of Patent: Apr. 26, 2022

(54) PLANT POT HAVING DRAIN OPENING

(71) Applicant: Peter Hubertus Elisabeth Ende, Van Den, DN Heerlen (NL)

(72) Inventor: Peter Hubertus Elisabeth Ende, Van Den, DN Heerlen (NL)

( * ) Notice: Subject to any disclaimer, the term of this patent is extended or adjusted under 35 U.S.C. 154(b) by 405 days.

(21) Appl. No.: 15/506,741

(22) PCT Filed: Sep. 3, 2015

(86) PCT No.: PCT/NL2015/050613
§ 371 (c)(1),
(2) Date: Feb. 26, 2017

(87) PCT Pub. No.: WO2016/068696
PCT Pub. Date: May 6, 2016

(65) Prior Publication Data
US 2017/0280642 A1    Oct. 5, 2017

(30) Foreign Application Priority Data

Feb. 13, 2015   (NL) ..................................... 2014292

(51) Int. Cl.
*A01G 27/04* (2006.01)
*A01G 9/04* (2006.01)
*A01G 24/35* (2018.01)
*A01G 9/02* (2018.01)

(52) U.S. Cl.
CPC ............ *A01G 27/04* (2013.01); *A01G 9/042* (2013.01); *A01G 9/02* (2013.01); *A01G 9/04* (2013.01); *A01G 24/35* (2018.02)

(58) Field of Classification Search
CPC . A01G 9/02; A01G 9/04; A01G 9/042; A01G 27/04; A01G 24/35
See application file for complete search history.

(56) References Cited

U.S. PATENT DOCUMENTS

| 2,026,679 | A | * | 1/1936 | Higgins | .................. | A01G 9/02 |
| | | | | | | 47/65.6 |
| 2,344,202 | A | * | 3/1944 | Carlson | .................. | A01G 27/04 |
| | | | | | | 47/80 |
| 4,160,342 | A | * | 7/1979 | Dryer | ..................... | A01G 27/04 |
| | | | | | | 47/80 |
| 4,171,593 | A | * | 10/1979 | Bigglestone | ........... | A01G 27/04 |
| | | | | | | 47/79 |

(Continued)

*Primary Examiner* — Monica L Barlow
(74) *Attorney, Agent, or Firm* — PatShegen IP LLC; Moshe Pinchas

(57) ABSTRACT

A plant pot 1 comprises a bounding wall 2 formed by a side wall 3 and a bottom 5 and includes a gel space 7 in which swellable gel grains 9 are accommodated filling the gel space in swollen state.
The plant pot further includes a substrate space 11 in which a substrate, for example, soil is accommodated. A bounding wall portion 2A, 2B bounds a part of the second space 11. Drainage openings 13 are located in the bottom 5 of this bounding wall portion 2B next to the gel space 7.
The first space 7 is partly bounded by a further bounding wall portion 2D, 2E of the bounding wall 2. Aeration openings 14 are located in this further bounding wall portion.
The gel grains 9 are contained in a pad which further includes a flexible separation sheet 15 which forms a root-permeable separation between the gel and soil during use.

4 Claims, 5 Drawing Sheets

(56) References Cited

U.S. PATENT DOCUMENTS

| | | | | |
|---|---|---|---|---|
| 5,168,664 A | * | 12/1992 | Deutschmann, Sr. | ............... A01G 27/008 47/59 R |
| 7,082,717 B1 | * | 8/2006 | Wang | ............... A01G 27/008 47/79 |
| 7,171,783 B1 | * | 2/2007 | Fidotti | ............... A01G 27/04 47/81 |
| 8,424,549 B1 | * | 4/2013 | Goldsmith | ............... E04H 15/60 47/67 |
| 9,038,312 B2 | * | 5/2015 | Harbaugh | ............... A01G 9/042 47/65.5 |
| 2005/0166455 A1 | * | 8/2005 | Nishida | ............... A01G 9/02 47/79 |
| 2006/0117656 A1 | * | 6/2006 | Graham | ............... A01G 27/00 47/65.8 |
| 2009/0199472 A1 | * | 8/2009 | Ito | ............... A01G 9/02 47/65.6 |
| 2013/0174483 A1 | * | 7/2013 | Caspar | ............... A01H 4/006 47/65.8 |
| 2015/0173305 A1 | * | 6/2015 | Kidder | ............... A01G 27/04 47/79 |

* cited by examiner

PLANT POT HAVING DRAIN OPENING

FIELD OF THE INVENTION

The invention relates to a plant pot comprising a bounding wall forming an open-top pot and including a bottom that bounds the under side of the pot as well as a side wall, the bottom forming the complete part of the bounding wall that is present between the side wall, the bounding wall having at least a single opening and a hydrating gel-filled first space which is located within the bounding wall, as well as a second space filled with a substrate different from gel, where the second space is partly bounded by a bounding wall portion of the bounding wall. The bounding wall portion may also form the complete bounding wall and the bounding wall portion may also be formed by a side wall portion and a portion of the bottom that either or not bounds said side wall portion. A root-permeable separation sheet (jute) may be present between the first and the second space so as to avoid the substrate mixing with the gel.

The roots of a plant grow into the gel which sticks to the roots. The gel forms a (nutrient) water buffer and provides protracted water supply to the plant. The aerated gel further provides improved supply of oxygen to the roots.

STATE OF THE ART

A plant pot of this type is known from EP-A-1 139 716. The gel extends over the entire bottom of the plant pot up to the side wall. A root-permeable separation sheet is present between the gel layer and the substrate located on top of it so as to avoid the substrate mixing with the gel. A disadvantage of this plant pot is that during use and in the event of too much water in the plant pot (for example, after torrential rain in a plant pot standing in the open air) the water continues to be on the soil on top of the saturated gel layer. Nutriments in the water may form a barrier layer on the gel closing the gel layer at the top from nutrient water and/or water, which is an undesired effect for optimum growth of a plant.

SUMMARY OF THE INVENTION

It is an object of the invention to provide a plant pot of the type defined in the opening paragraph where a surplus of nutrient water and/or water cannot have an adverse effect on the plant growth. For this purpose, the plant pot according to the invention is characterized in that the opening is located in said bounding wall portion and forms a drainage opening for draining the surplus of nutrient water and/or water that cannot be absorbed by the gel during use. As a result, the disadvantages of the known plant pot mentioned above do not occur.

The drainage opening is preferably situated in or near a lower bounding edge of the bounding wall portion for draining the surplus of nutrient water and/or water. The drainage opening preferably bounds the lower bounding edge or is located at the lower bounding edge. In a preferred embodiment the drainage opening is located in the bottom.

In a further preferred embodiment the first space is partly bounded by a further bounding wall portion of the bounding wall and at least a single aeration opening is located in this further bounding wall portion for additional aeration via the gel of the roots of the plant.

The first space is mostly located on a part of the bottom. In a specific embodiment the first space is located at a distance over a part of the bottom, where the substrate or a different substrate, for example, grains of clay, is present in the space between the first space and the bottom.

A preferred embodiment of the plant pot according to the invention is characterized in that near or at the height of the first space the bounding wall is provided with at least a single aeration opening which is resent for improved aeration of the gel.

A still further embodiment of the plant pot according to the invention is characterized in that the plant pot comprises a partition wall which is located within the side wall in the plant pot and is connected or attached to or forms part of the bottom, where the first space is located within the partition wall.

In an advantageous embodiment the partition wall is formed by flexible upright flaps so as to facilitate compact nesting of the plant pot.

In a further advantageous embodiment the partition wall is formed by a part of the bottom and the partition wall comprises two wall portions spaced apart from each other, where the space between the wall portions is located outside the bounding wall of the plant pot.

Preferably, in this embodiment the aeration opening is located in the inner wall portion and the space between the wall portions is connected to the environment via the channel for aeration of said space.

For not needing water from outside the plant pot when the plant pot with non-swollen gel is brought in use and during the swelling of the gel, in a further embodiment the lower part of the inner wall portion and the part of the bottom within the partition wall are closed, which is to say: not provided with openings. In this manner a plate is formed that can function as a water buffer for the swelling of the gel.

A separation sheet, for example a sheet of jute, is located preferably between the top of the first space and the second space so as to avoid mixing of the substrate and the gel.

A further embodiment of the plant pot according to the invention is characterized in that the plant pot comprises a open-top inner pot which is present in said plant pot and in which the first space is present. In the initial stage of growth the plant can be cultivated in this inner pot and in a later stage the plant may be placed with gel and inner pot into the plant pot for further cultivation.

Preferably, the first space is located completely within the inner pot. The inner pot is preferably located at a distance from or on the bottom of the plant pot or is attached to the bottom of the plant pot.

In an alternative embodiment, after initial cultivation of the plant in the inner pot, the plant is removed from the inner pot together with the gel and the substrate that may cover the gel and placed into the plant pot as a whole, after which the plant pot is filled with substrate for further cultivation of the plant.

At least a single recess is located preferably at the bottom of the side wall and a channel is provided from this recess up to a space beneath a raised part of the bottom, which channel is bounded by a vaulted part of the bottom for aeration of said space. Said space may be a space between wall portions of the partition wall and/or may be a space beneath a raised part of the bottom of the plant pot.

Yet another embodiment of the plant pot according to the invention is characterized in that the plant pot includes a plate that has a closed plate bottom and a raised plate wall, which plate is located underneath the bottom and around the lower part of the side wall, or around the lower part of the inner one of the two wall portions of the partition wall, and a third space is located between the plate wall and the lower part of the side wall or the lower part of the inner wall portion. This third space contributes to considerable air circulation which is essential to the plant development and as a result the roots located in the first space are accommodated in a moist but aerated space, so that root rot is prevented and/or bacteria and fungi cannot be developed. This third space has the same function as that of the plant pot known from EP-A-1 139 716, the contents of which document are to be regarded as hereby incorporated by reference. The plate is preferably detachably connected to the bottom.

The invention likewise relates to a plant pot comprising a bounding wall which forms an open-top pot and including a bottom that bounds the under side of the pot as well as a side wall, where the bottom forms the complete bounding wall portion that is located between the side wall and is provided with at least a single opening, and where on or above at least part of the bottom evenly distributed swellable hydrating gel is present. As regards this plant pot the invention is characterized in that the plant pot comprises an upright partition wall which forms a separation between two spaces above the bottom, where in either of the spaces the gel is present and in the other space no gel is present, and in that the opening is located in the part of the bottom where no gel is present on or above the bottom and forms a drainage opening for draining a surplus of nutrient water and/or water that cannot be absorbed by the gel. The partition wall may be double-walled here too and either detachably or not connected to the rest of the bottom. The partition wall may also be the side wall of an inner pot which is present on the bottom of the plant pot.

The embodiments defined above may also be embodiments of the above-defined plant pot in which the gel is contained in non-swollen state. The gel may be present for example in the form of grains or powder.

BRIEF DESCRIPTION OF THE DRAWINGS

Hereinbelow the invention will be further described with reference to the appended drawings of examples of embodiment of the plant pot according to the invention, in which.

DETAILED DESCRIPTION OF THE DRAWINGS

Figure 1:
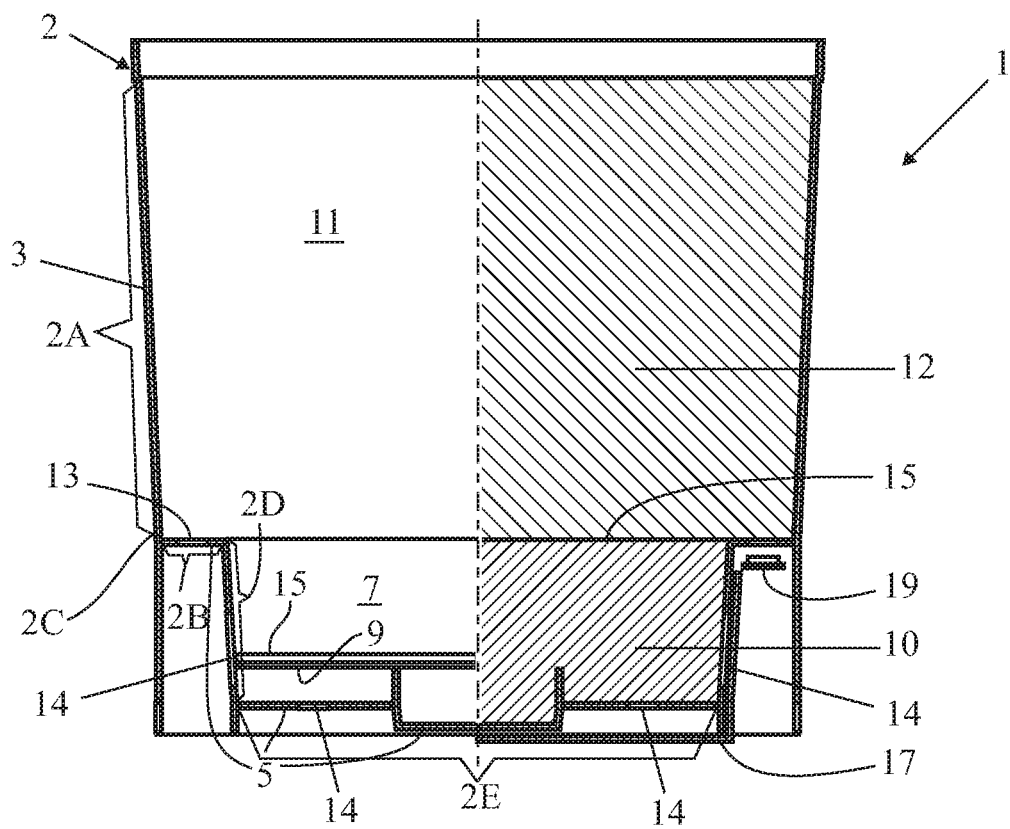
FIG. 1 represents a sectional view taken through a first embodiment of the plant pot.

FIG. 1 represents a sectional view taken through a first embodiment of the plant pot according to the invention. The left half of the Figure represents the plant pot 1 prior to being used and containing gel in the form of grains in a non-swollen state and the right half of the Figure represents the plant pot during use containing gel grains swollen into a gel layer 10 and containing a substrate layer 12 on top of the gel layer. The substrate layer in this example is a layer of soil.

The plant pot 1 comprises a bounding wall 2 formed by a side wall 3 and a bottom 5 and has a first space which forms a gel space 7 and is located above the bottom and between the side wall. This gel space 7 contains swellable gel grains 9 in swollen state filling the gel space. The plant pot further has a second space which forms a substrate space 11 which is located above and/or beside the gel space and which contains a substrate, for example, soil during use. A bounding wall portion formed by the top 2A of the side wall 3 and an outer ring 2B of the bottom 5 bound a part of the second space 11.

The bottom 5 of this bounding wall portion has in addition to the gel space 7 drainage openings 13 via which the substrate space 11 is connected to the space outside the plant pot. The drainage openings 13 are present at the height of a lower bounding wall 2C of the bounding wall portion 2A, 2B. The former space 7 is partly bounded by a further bounding wall portion 2D, 2E of the bounding wall 2. Aeration openings 14 are provided in this further bounding wall portion. The gel grains 9 are present in a pad which further includes a flexible separation sheet 15 which forms a root-permeable separation between the gel and the soil during use.

The plant pot further has a plate 17 which is detachably attached to the under side of the bottom 5 and is located solely underneath the gel space 7. Furthermore, the plant pot has a plurality of removable plugs 19 which can shut off the drainage openings 13.

Figure 2:
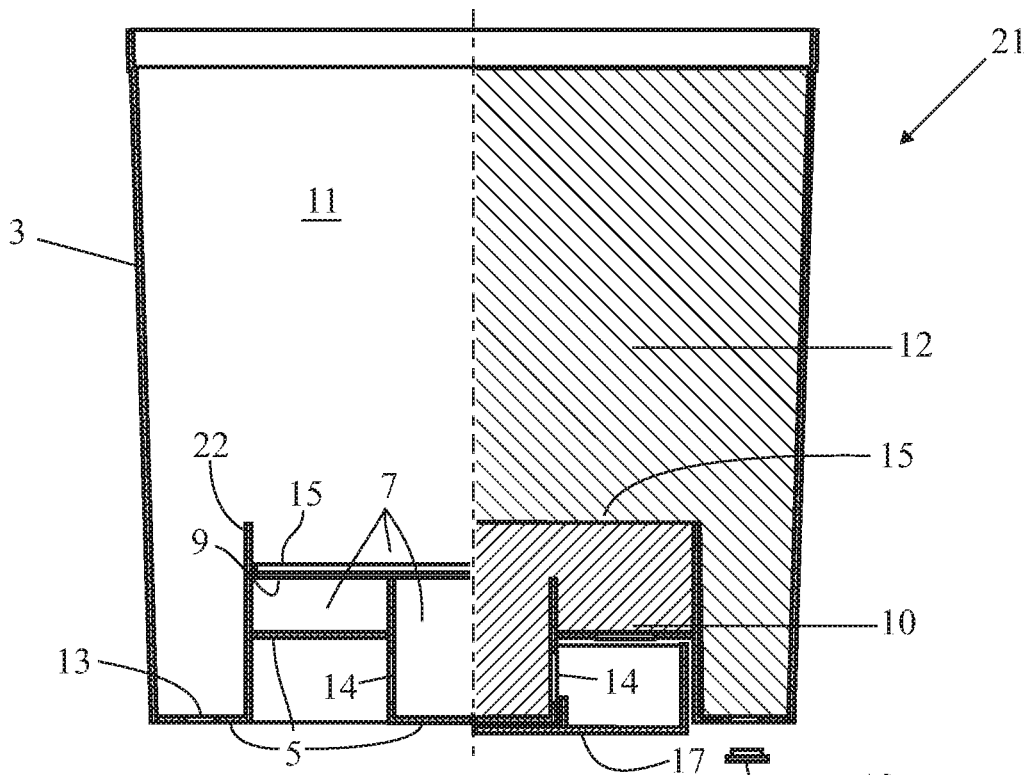
FIG. 2 represents a sectional view taken through a second embodiment of the plant pot.

FIG. 2 represents a sectional view taken through a second embodiment of the plant pot. In this plant pot 21 the bottom is provided with a partition wall 22 which is located within the side wall 3 and is lower than the side wall, while the gel space 7 is located at one side of the partition wall.

Figure 3:
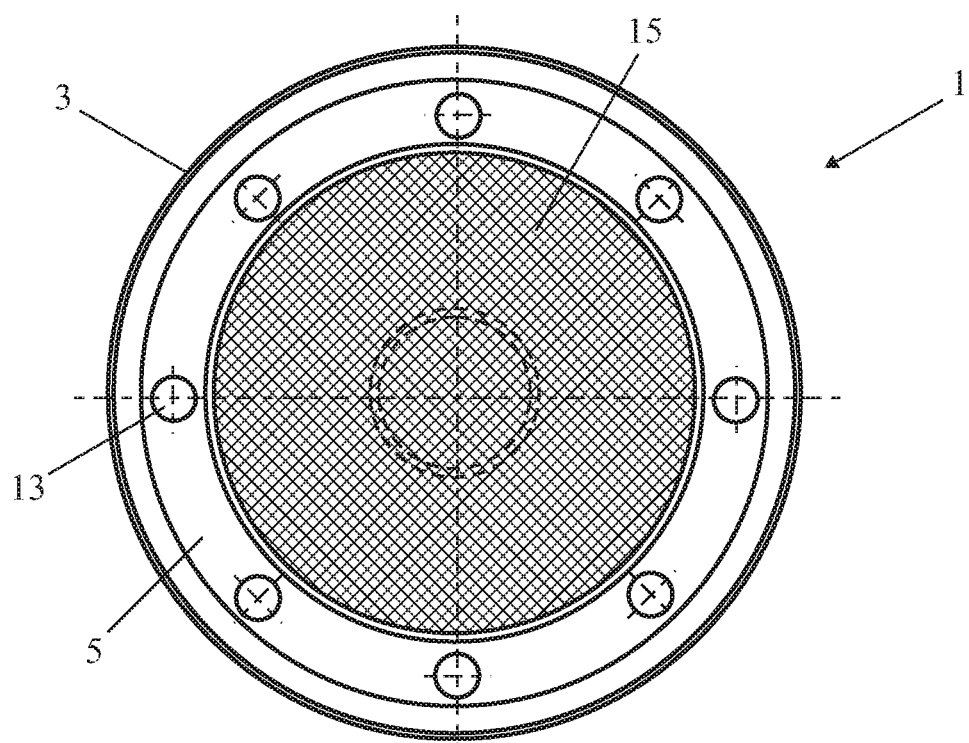
FIG. 3 represents a plan view of the plant pot represented in FIG. 1.

FIG. 3 represents a plan view of the plant pot represented in FIG. 1. The drainage openings 13 are located in a raised part of the bottom 5 which is located in annular form against the side wall 3.

Figure 4:
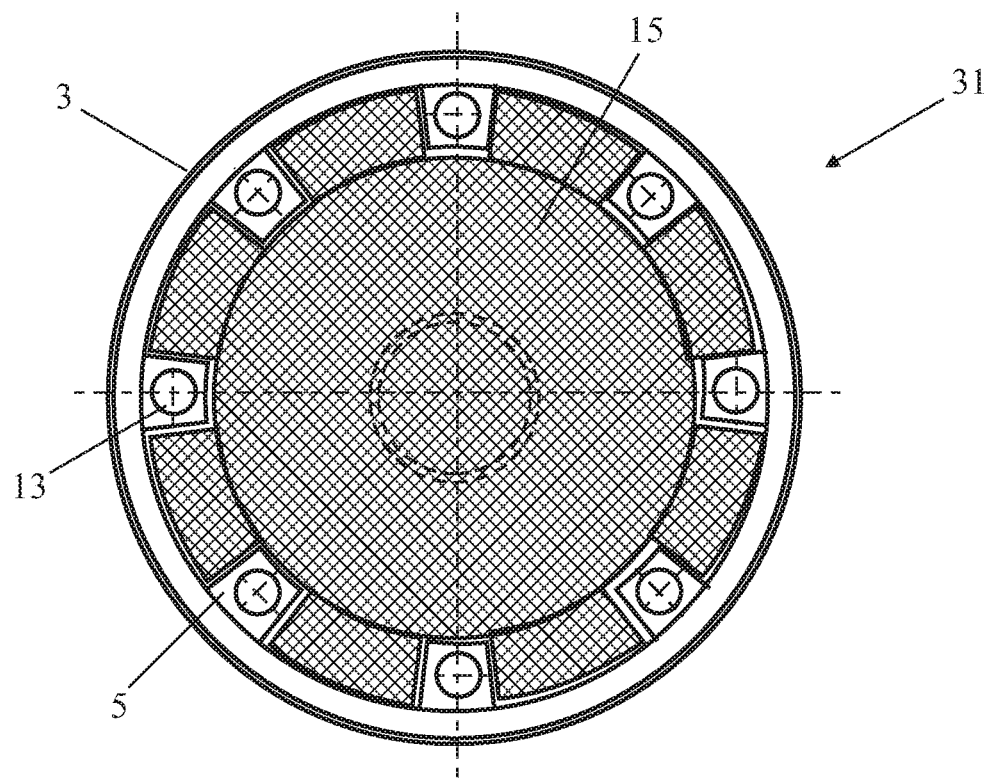
FIG. 4 represents a plan view of a third embodiment of the plant pot.

FIG. 4 represents a plan view of a third embodiment of the plant pot. In this plant pot 31 the drainage openings 13 are located in local raised parts of the bottom 5.

Figure 5:
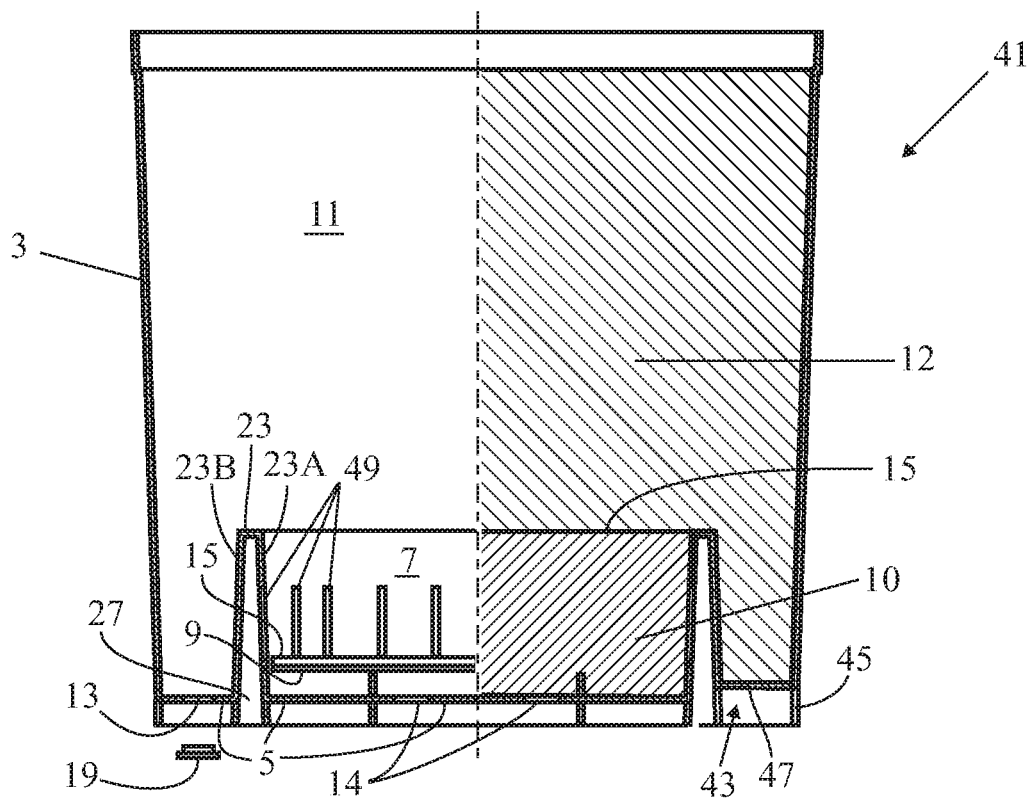
FIG. 5 represents a sectional view taken through a fourth embodiment of the plant pot.

FIG. 5 represents a sectional view taken through a fourth embodiment of the plant pot. In this plant pot 41 the partition wall 23 is double-walled, while the space 27 between the wall portions 23A and 23B at the under side of the plant pot has an open connection to the environment through a channel 43 that is formed by a recess 45 in the side wall and a vaulted part 47 of the bottom. The gel space 7 is then located within the partition wall 23 whose inner wall portion 23A is provided with slotted aeration openings 49. The lower part of the inner wall portion 23A and the part of the bottom 5 within the partition wall 23 are then closed and may form a water buffer.

Figure 6:
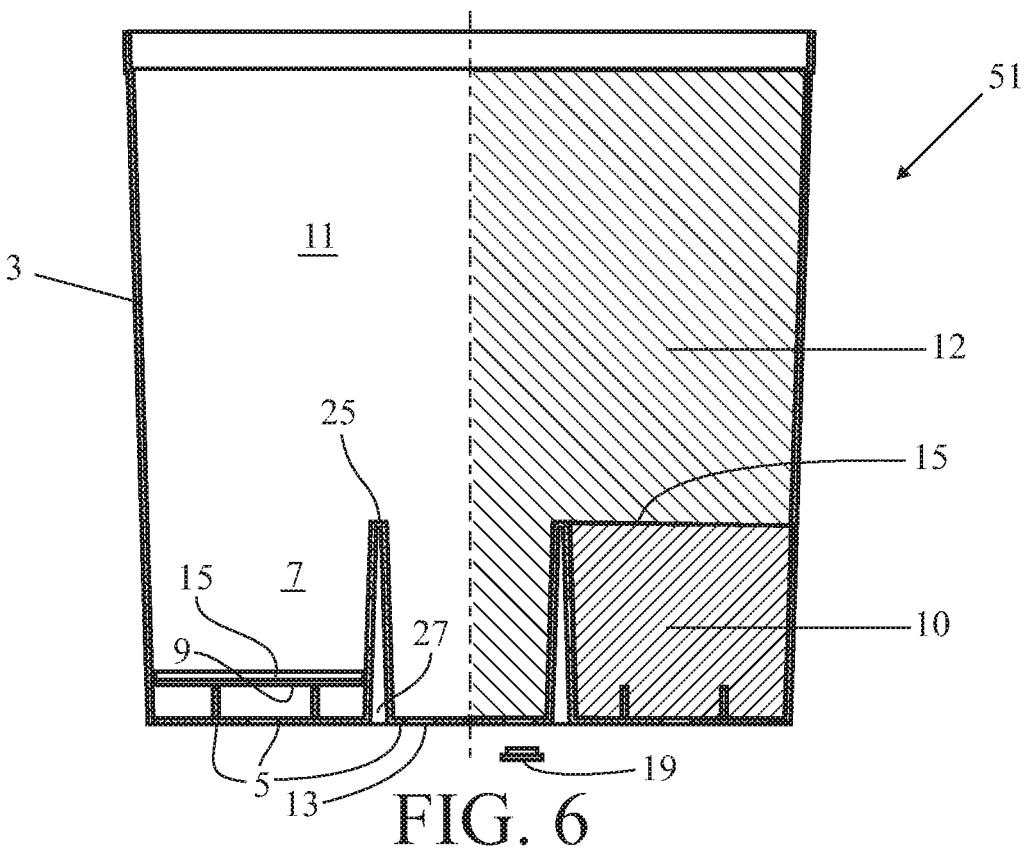
FIG. 6 represents a sectional view taken through a fifth embodiment of the plant pot.

FIG. 6 represents a sectional view taken through a fifth embodiment of the plant pot. In this plant pot 51 the gel space 7 is located between the partition wall 25 and the side wall 3.

Figure 7:
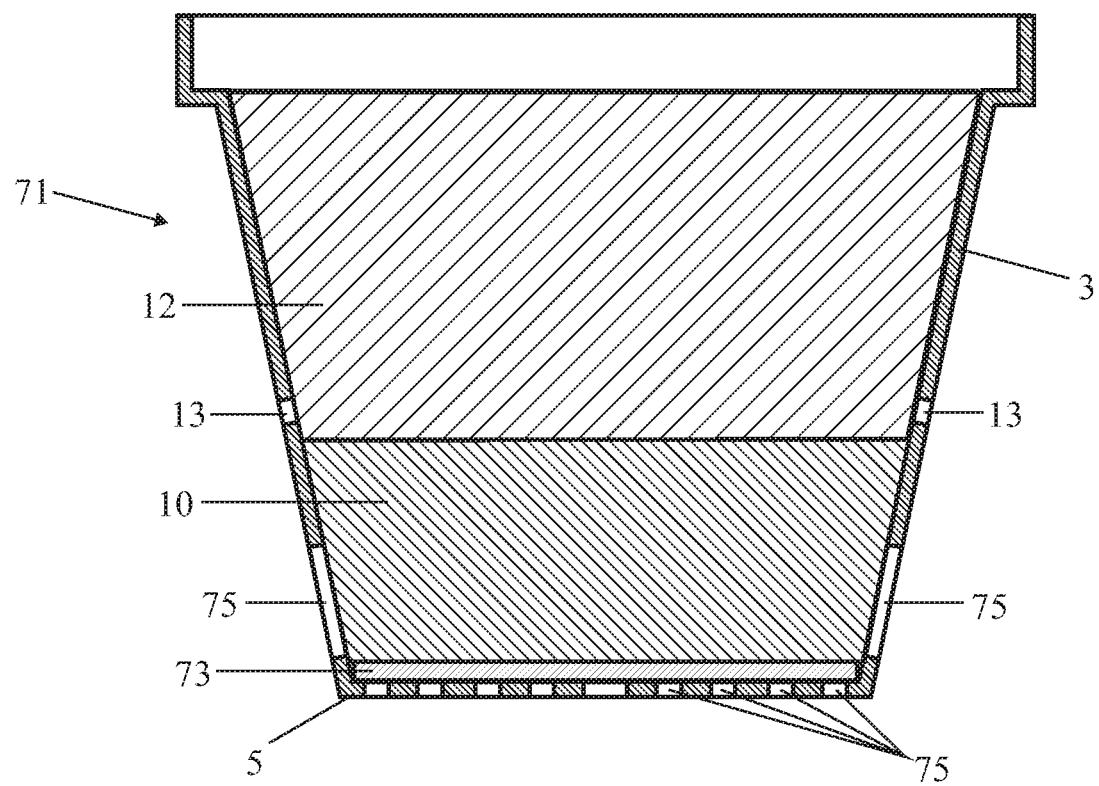
FIG. 7 represents a sectional view taken through a sixth embodiment of the plant pot.

FIG. 7 represents a sectional view taken through a sixth embodiment of the plant pot. In this plant pot 71 is located a flexible sheet 73 spread across the aeration openings 75 in the bottom 5 and the drainage openings 13 are located in the outside wall 3 above the gel layer 10 at the height of the substrate layer 12.

Figure 8:
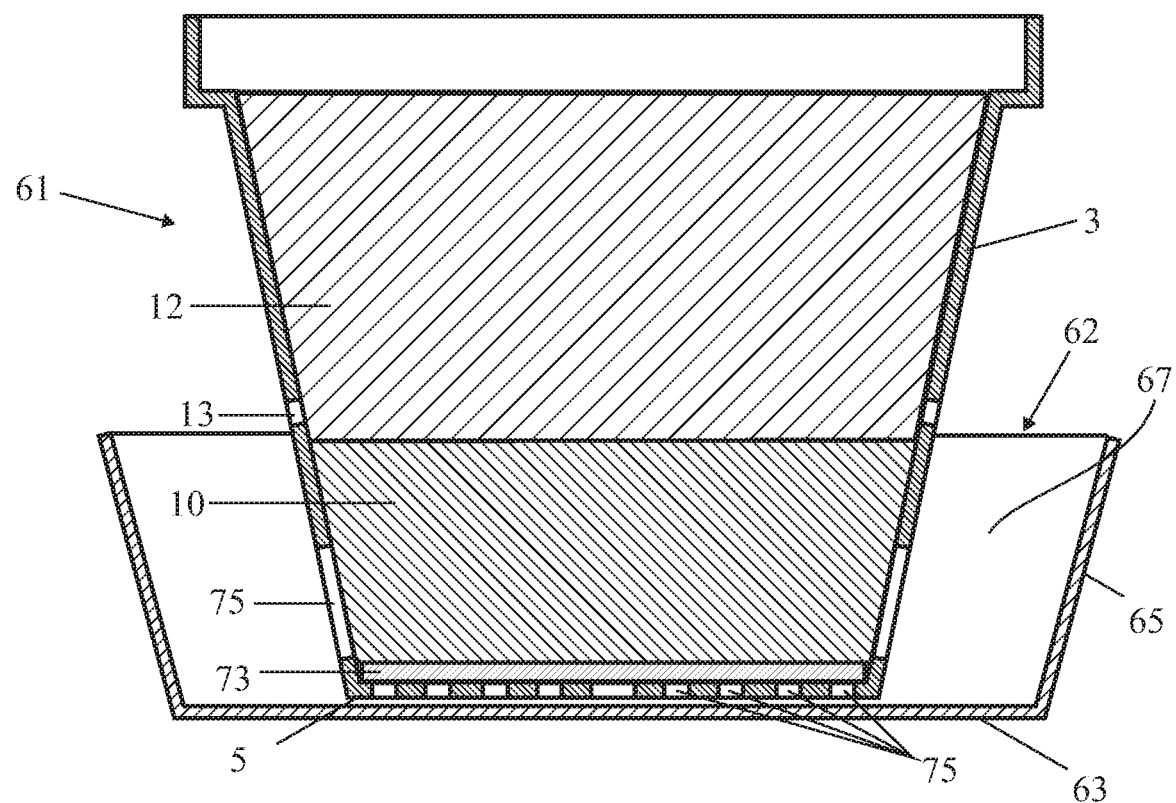
FIG. 8 represents a sectional view taken through a seventh embodiment of the plant pot.

FIG. 8 represents a sectional view taken through a seventh embodiment of the plant pot. This plant pot 61 has a plate 62 that has a closed plate bottom 63 and an upright plate wall 65. This plate is located underneath the bottom 5 and surrounds the lower part of the side wall 3. Between the plate wall and the lower part of the side wall is situated a third space 67. This third space enhances a strong air circulation thus enhancing the growth of the plant. As a result of this, the roots present in the first space are situated in a moist, but aeratable space.

Figure 9:
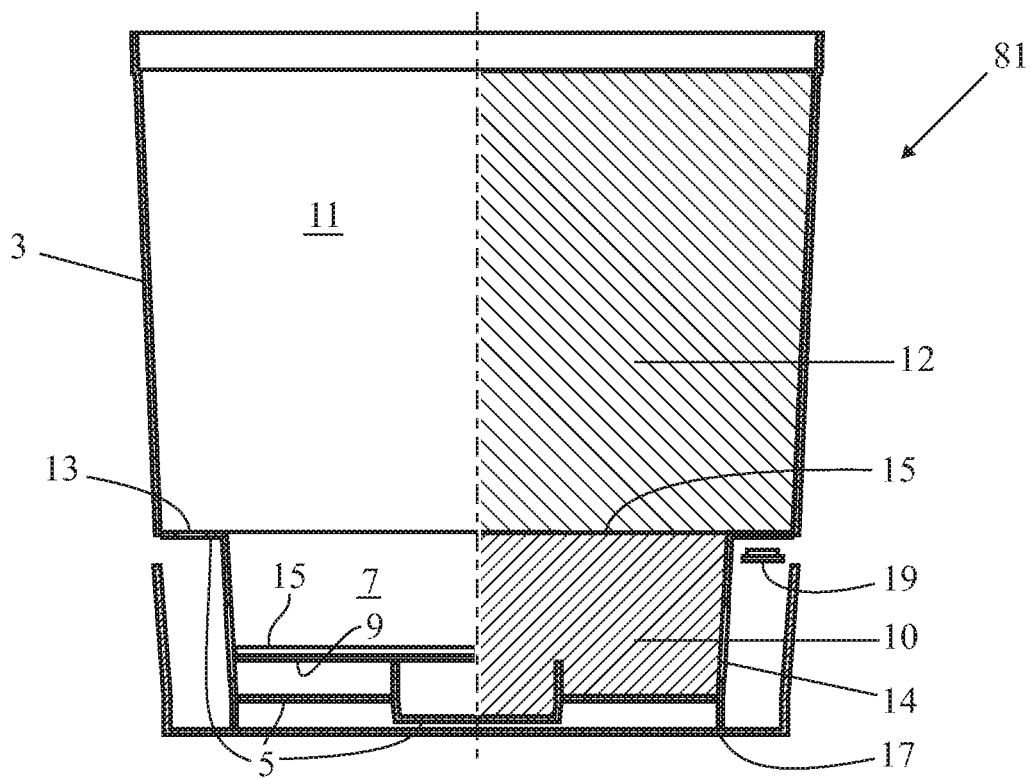
FIG. 9 shows a sectional view taken through an eighth embodiment of the plant pot.

FIG. 9 represents a sectional view taken through an eighth embodiment of the plant pot. In this plant pot 91 the gel layer 10 is located above a first part of the bottom 5 and the outer ring of the bottom forms a second part above which there is no gel layer.

Figure 10:
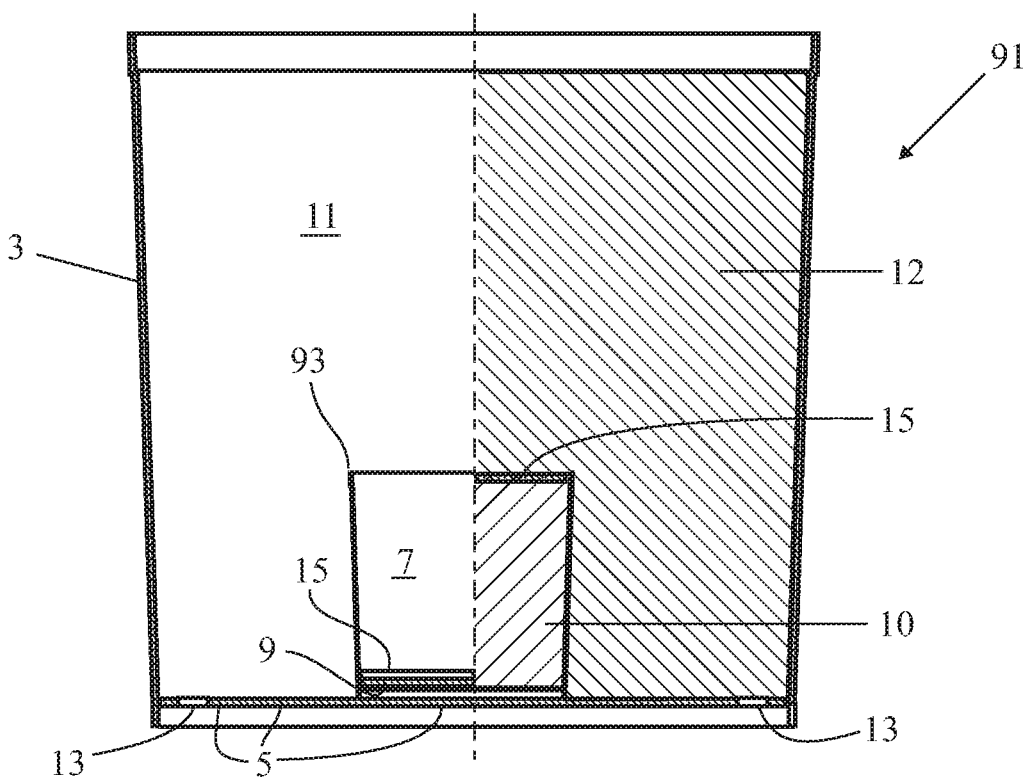
FIG. 10 shows a sectional view taken through a ninth embodiment of the plant pot.

FIG. 10 represents a sectional view taken through a ninth embodiment of the plant pot. In this plant pot 91 the partition wall forms part of an inner pot 93 which is located on the bottom 5. The bottom of the inner pot and the bottom of the plant pot beneath it are provided with aeration openings (not shown in this drawing).

Albeit the invention has been described in the foregoing with reference to the drawings, it should be pointed out that the invention is not by any manner or means restricted to the embodiments shown in the drawings. The invention also extends over any embodiments deviating from the embodiments shown in the drawings within the scope defined by the claims.

The invention claimed is:

1. A plant pot comprising:
    a bounding wall forming an open-top pot and defining an outer wall of the plant pot, said bounding wall including a side wall and a bottom defined at the under side of the side wall;
    a hydrating gel filled first space which is located within the bounding wall and is defined by a first part of the bounding wall comprising a first portion of the bottom;
    a second space filled with a substrate different from gel, which second space is located within the bounding wall and having a first section located above the first space and a second section located alongside the first space, said second space is defined by a second part of the bounding wall comprising a second portion of the bottom and a portion of said sidewall;
    wherein a root-permeable separation sheet is located between the top of the first space and the second space above the first space;
    at least one drainage opening in the second portion of the bottom for draining a surplus of nutrient water and water that cannot be absorbed by the gel during use;
    wherein the substrate in the second section of the second space is directly in contact with the hydrating gel in the first space.

2. A growing device as claimed in claim 1, wherein the plant pot comprises a partition wall which is located within the bounding wall between the first space and the second section of the second space located alongside the first space, said partition wall is connected or attached to or forms part of the bottom.

3. A growing device as claimed in claim 1, wherein said first part of the bounding wall further includes a portion of the sidewall other than said portion of the side wall defining said second part of the bounding wall, and at least one aeration opening being in said portion of the side wall.

4. A growing device as claimed in claim 1, wherein in said first part of the bounding wall there is at least one aeration opening.

* * * * *